(12) United States Patent
Chen

(10) Patent No.: US 10,855,624 B2
(45) Date of Patent: Dec. 1, 2020

(54) METHOD AND DEVICE FOR PROVIDING A BACKUP LINK

(71) Applicant: INTERDIGITAL CE PATENT HOLDINGS, Paris (FR)

(72) Inventor: An Chen, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 32 days.

(21) Appl. No.: 16/305,689

(22) PCT Filed: May 31, 2016

(86) PCT No.: PCT/CN2016/084015
§ 371 (c)(1),
(2) Date: Nov. 29, 2018

(87) PCT Pub. No.: WO2017/206045
PCT Pub. Date: Dec. 7, 2017

(65) Prior Publication Data
US 2020/0213248 A1    Jul. 2, 2020

(51) Int. Cl.
| H04L 12/939 | (2013.01) |
|---|---|
| H04L 12/28 | (2006.01) |
| H04L 12/46 | (2006.01) |
| H04L 12/66 | (2006.01) |
| H04L 29/08 | (2006.01) |

(52) U.S. Cl.
CPC ........ *H04L 49/557* (2013.01); *H04L 12/2898* (2013.01); *H04L 12/4633* (2013.01); *H04L 12/66* (2013.01); *H04L 49/555* (2013.01); *H04L 67/02* (2013.01); *H04L 67/2814* (2013.01)

(58) Field of Classification Search
CPC .............. H04L 49/557; H04L 12/2898; H04L 12/4633; H04L 12/66; H04L 49/555; H04L 67/02; H04L 67/2814
See application file for complete search history.

(56) References Cited

U.S. PATENT DOCUMENTS

| 8,913,484 B2 | 12/2014 | Kompella et al. |
|---|---|---|
| 9,191,986 B2* | 11/2015 | Zhao ..................... H04W 76/04 |
| 2002/0151302 A1 | 10/2002 | Schmidt et al. |
| 2008/0080365 A1 | 4/2008 | Weeresinghe |
| 2014/0328161 A1 | 11/2014 | Haddad et al. |
| 2015/0326471 A1 | 11/2015 | Anandan et al. |

FOREIGN PATENT DOCUMENTS

| CN | 105577444 | 5/2016 | |
|---|---|---|---|
| JP | 2010062618 | * 3/2010 | ............ H04L 12/56 |
| WO | WO 2010044714 A1 | 4/2010 | |
| WO | WO 2013072046 A1 | 5/2013 | |
| WO | WO2016034575 | 3/2016 | |

* cited by examiner

*Primary Examiner* — Ronald B Abelson
(74) *Attorney, Agent, or Firm* — Volpe Koenig

(57) ABSTRACT

It is provided a method for providing a communication backup link, wherein a user device has a first connection to a gateway and a second connection to Internet, and the gateway has a connection to Internet, wherein at gateway comprising detecting disruption of the connection to Internet (301); and establishing a tunnel between the gateway and the user device as the communication backup link to Internet (306).

17 Claims, 2 Drawing Sheets

METHOD AND DEVICE FOR PROVIDING A BACKUP LINK

This application claims the benefit, under 35 U.S.C. § 365 of International Application PCT/CN2016/084015, filed May 31, 2016, which was published in accordance with PCT Article 21(2) on Dec. 7, 2017, in English.

TECHNICAL FIELD

The present disclosure relates to data communication, and more particularly to a method and a device for providing a backup link.

BACKGROUND

Customer premises equipment (CPE) is an equipment that is located at the customer premises and can communicate with a device at network operator's premises. In most cases, a CPE and a network operator device are connected through wired broadband network(s). Many operators request the CPEs to be capable of doing wireless link backup in case of the wired link failure. The wireless link backup enables the end users to continue their Internet access and help operators perform a remote diagnostics via the wireless backup link. The remote diagnostics are essential to solving the issue of the wired link failure.

However, the wireless link backup function on the CPE normally requires a dedicated wireless module, i.e. a USB dongle, which brings an additional hardware cost as well as the development cost on the CPE to enable the function.

SUMMARY

According to an aspect of the present invention, it is provided a method for providing a communication backup link, wherein a user device has a first connection to a gateway and a second connection to Internet, and the gateway has a connection to Internet, wherein at gateway comprising detecting disruption of the connection to Internet (301); and establishing a tunnel between the gateway and the user device as the communication backup link to Internet (306).

According to an aspect of the present invention, it is provided a device for providing a communication backup link, wherein comprising a first link interface 202 for providing a connection to Internet; a second link interface 203 for providing a first connection to a user device, wherein the user device has a second connection to Internet; a processor 201 for determining a disruption of connection to Internet; and establishing the tunnel between the device and the user device as the communication backup link to Internet.

According to an aspect of the present invention, it is provided computer program comprising program code instructions executable by a processor for implementing a method stated above.

According to an aspect of the present invention, it is provided a computer program product which is stored on a non-transitory computer readable medium and comprises program code instructions executable by a processor for implementing a method stated above.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DETAILED DESCRIPTION

The embodiment of the present invention will now be described in detail in conjunction with the drawings. In the following description, some detailed descriptions of known functions and configurations may be omitted for clarity and conciseness.

Figure 1:
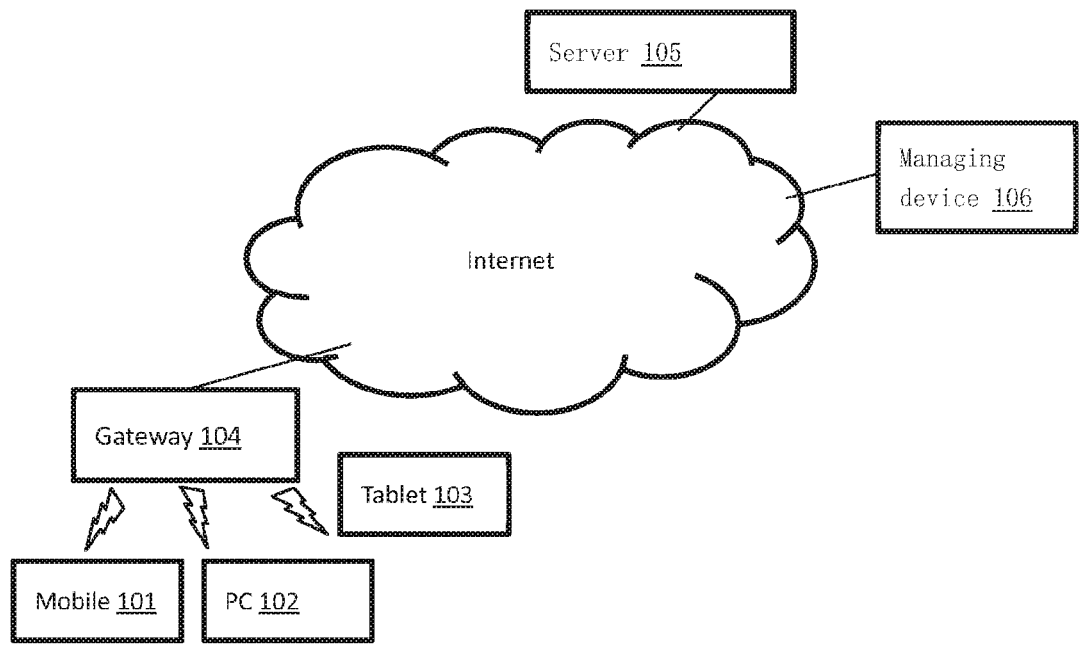
FIG. 1 is a system diagram according to prior art.

FIG. 1 is a system diagram according to prior art.

At the user side, it includes a mobile 101, a personal computer (PC) 102, a tablet 103 and a gateway 104. The mobile 101 and the tablet 103 connect to the gateway 104 through wireless connection (wireless interface), e.g. IEEE 802.11. The PC 102 connects to the gateway 104 through either wireless connection e.g. 802.11 or wired connection, e.g. Ethernet connection (RJ-45 interface/port). The gateway 104 connects to the Internet through wired connection, e.g. DSL, PON (passive optical network), RJ-45 port, EPON, GPON, WiFi (802.11) etc. It shall note that the diagram is for illustrative purpose, and at the user side the number of devices connecting to the gateway 104 is arbitrary and is not limited to three.

At the remote side, it includes a server 105 for providing a web page, and a managing device at the network operator 106 that is able to control or diagnose the gateway 104 remotely. They both connect to the Internet. It shall note that the diagram is for illustrative purpose, and there can be more devices and servers at the remote side.

In this example, if the connection, which is a main link, of the gateway 104 to the Internet becomes disrupted or down, any one of the mobile 101, the PC 102 and the tablet 103 cannot access content on the Internet, nor can the managing device 106 control or diagnose the gateway 104.

Therefore, a backup link is desired when the connection of the gateway 104 to the Internet becomes disrupted. The backup link is used by the managing device 106 to diagnose or solve the disruption issue.

Figure 2:
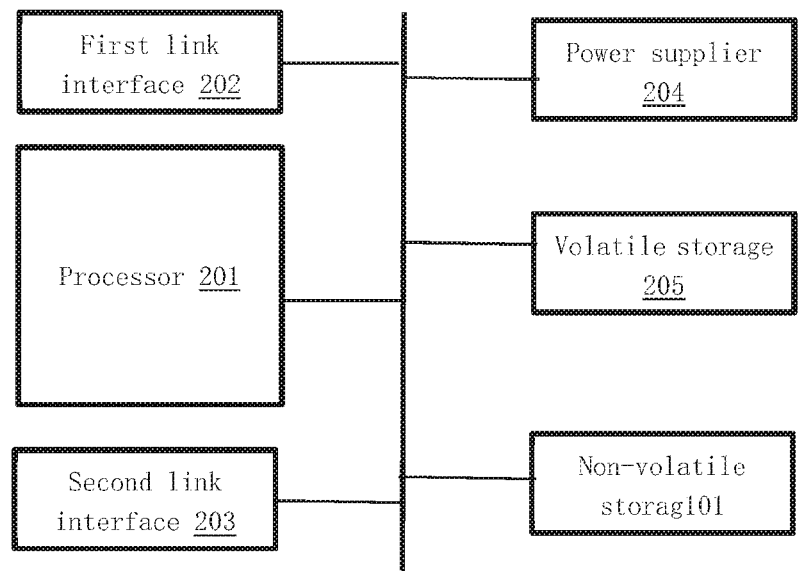
FIG. 2 is a block diagram of an exemplary gateway according to an embodiment of the present disclosure.

FIG. 2 is a block diagram of an exemplary gateway according to an embodiment of the present disclosure.

It includes a microprocessor (MPC) or processor 201, at least one first link interface 202, at least one second link interface 203, a power supplier 204, a volatile storage 205 and a non-volatile storage 206.

The MPC 201 is used to process program instructions stored on the non-volatile storage 206.

The first link interface 202 is used to receive and send data from and to the Internet. Its type comprises Ethernet transceiver, DSL transceiver, WiFi transceiver, ONU (optical network unit) or ONT (optical network terminal) etc.

The second link interface 203 is used to receive and send data from and to user devices, e.g. the mobile 101, the PC 102, the tablet 103 in the FIG. 1. Its type comprises Ethernet transceiver, WiFi transceiver etc.

The power supplier 204 is used to supply power to all modules of the gateway. It usually converts alternating current to a 5 V direct current.

The volatile storage 205 is used to store temporary data. In implementations, it can use volatile random access memory (RAM), e.g. SDRAM.

The non-volatile storage 206 is used to store data and program instructions, which remain in the non-volatile storage 306 if it is not powered. In implementations, it can use read only memory (ROM), flash etc. As to flash, it can use NOR flash and NAND flash.

According to the implementation requirements, the gateway may further include at least one of a Bluetooth transceiver, a ZigBee transceiver, a USB port, a USB/SD/MMC port for storage expansion, a LED indicator for indicating the status of a certain function, a physical button on the gateway body to enable and disable a certain function, a display for displaying information, and a display port for connecting to a display in order for displaying information.

In the normal state, the gateway 104 works as a router between user devices and the remote server 105. But due to reasons, such as disruption of physical link between the gateway 104 and the Internet, incorrect configuration of the gateway etc., the link or connection of the gateway towards the Internet becomes disrupted. And consequently, the client device cannot communicate with the server. In the embodiment, because the mobile 101 has a data communication link to be able to access the Internet, e.g. a cellular data network managed by telecom operators, the data communication link is used as a backup link on the gateway for all user devices at user premises to access Internet.

Figure 3:
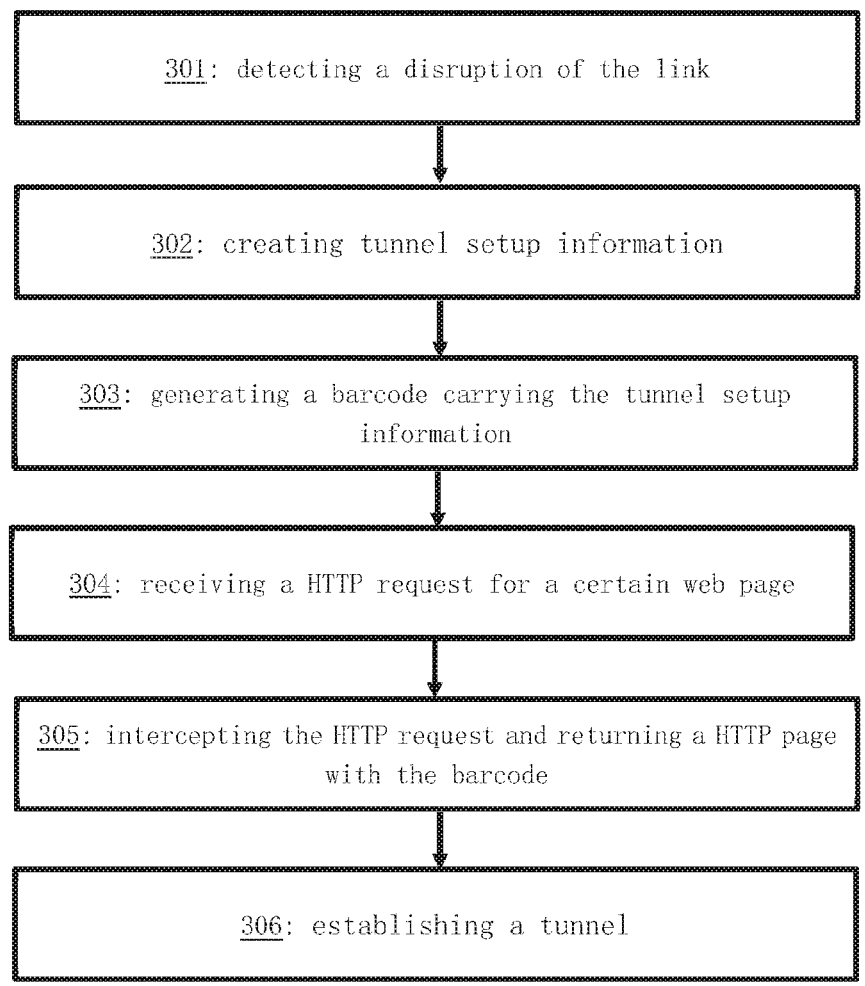
FIG. 3 is a flow chart showing a method for providing a communication backup link during a disruption of gateway's link to the Internet according to an embodiment of the present disclosure.

FIG. 3 is an exemplary flow chart showing a method for providing a communication backup link through the mobile 101 during a disruption of gateway's link to the Internet according to an embodiment of the present disclosure. In this example, as discussed previously, the second link interface 203 includes a WiFi transceiver or a wire interface such as an Ethernet transceiver. The WiFi transceiver works in (Access Point) AP mode. All user devices may connect to the gateway 104 via the WiFi transceiver. The PC 102 may connect to the gateway 104 via the Ethernet transceiver or the WiFi transceiver.

In the step 301, the first link interface 202 detects a disruption of the link to the Internet. There are several non-limiting ways to detect the link disruption:
1. The processor 201 via the first link interface 202 periodically sends an IP ping packet/DNS (domain name server) query to a remote server/DNS sever. If the first link interface 202 does not receive a successful reply within a given time period, the link is considered to be disrupted.
2. The processor 201 via the first link interface 202 periodically checks physical layer signal of the first link interface 202. If no signal is detected on the DSL port in DSL system if the first link interface 202 is a DSL interface, no carrier is detected on Ethernet port in Ethernet system if the first link interface 202 is an Ethernet interface, or no laser light is detected on the PON port in PON system if the first link interface 202 is a PON interface, the link is considered to be disrupted.
3. Some operating system supports the interface up/down/update events. Gateway 104 can decide and maintain the status information of the link based on the events.

In the step 302, the processor 201 is operative or configured to create tunnel setup information in order for the mobile 101 to set up a tunnel between the WiFi transceiver and the mobile 101. The tunnel is in compliance with one of tunneling protocols, including Point-to-Point Tunneling Protocol (PPTP), Layer 2 Tunneling Protocol (L2TP), Secure Shell (SSH) Tunneling etc. The tunnel setup information is used to set up a tunnel over WiFi between the WiFi transceiver of the gateway 104 and the mobile 101, and it comprises the following:
1. a WiFi SSID (service set identifier) with corresponding credential (for example WPA/WPA2 Pre-Shared Key) and an IP interface of the WiFi transceiver (i.e. IP address of the gateway at the side of second link interface 203)
2. Supported tunnel server types which might be PPTP or L2TP/IPSec.
3. Tunnel setup Information. For PPTP, it consists of the PPTP server address (it might be the same IP address of the IP interface of the WiFi SSID above), PPTP username and password. For L2TP/IPSec, it may consist of L2TP server address, L2TP username/password and the preshared key for IPSec.

In another variant implementation, the processor 201 is also operative or configured create a control URL of the gateway 104. The control URL of the gateway 104 can be accessed by user devices, e.g. the mobile 101, and used by them as an interface to control some functions that the gateway 104 opens to the user devices. In an example, in order to implement a function that the gateway 104 can send a notification to the mobile 101, a control URL of gateway 104 is generated and sent to the mobile 101 in order to enable the mobile 101 to register the notification means. The notification means is a control URL of the mobile 101. The gateway 104 can use the control URL of the mobile 101 to send a notification to the mobile 101. An example of the control URL of the gateway 104 is http://gateway's IP interface/notification.html. After the mobile 101 obtains the control URL of the gateway 104, the mobile 101 registers the notification means to the gateway 104 by sending a URL request, e.g. http://gateway's IP interface/notification.html?registration=http://address of the mobile 101/backupcontrol.html?GATEWAY=xxx; linkrestored=yes. Then the processor 201 of the gateway 104 stores the notification means (http://address of the mobile 101/backupcontrol.html?GATEWAY=xxx; linkrestored=yes) in the non-volatile storage 206, and uses it later to inform the mobile 101.

Below shows a first example of tunnel setup information. In this and following examples, assuming IP address of the WiFi transceiver of the gateway is 192.168.1.1.

[Wifi Setup] SSID=1234;SecurityMode=WPA2-PSK; PSK=12345

[TunnelSetup] SupportedTunnel=PPTP, L2TP/IPSec

[PPTP] Server=192.168.1.1;Username=1234;Password=1234

[L2TP] Server=192.168.1.1;Username=1234;Password=1234; presharedkey=abcdefghi

[NotificationRegisteration] Register=http://192.168.1.1/notification.html

In first example, the gateway 104 gives a list of supported tunnel protocols for the mobile 101 to select. In a variant example, the gateway 104 selects one tunnel protocol. Below shows a second example.

[Wifi Setup] SSID=1234;SecurityMode=WPA2-PSK; PSK=12345

[TunnelSetup] SupportedTunnel=PPTP

[PPTP] Server=192.168.1.1;Username=1234;Password=1234

[NotificationRegistration] Register=http://192.168.1.1/notification.html

In the second example, it includes a control URL. In a third example as shown below, it does not implement the function to inform the mobile 101 of link restoration.

[Wifi Setup] SSID=1234;SecurityMode=WPA2-PSK; PSK=12345

[TunnelSetup] SupportedTunnel=PPTP, L2TP/IPSec

[PPTP] Server=192.168.1.1;Username=1234;Password=1234

[L2TP] Server=192.168.1.1;Username=1234;Password=1234;

presharedkey=abcdefghi

In the third example, it lists SSID and Security Mode. The advantage is that if the mobile 101 does not connect to the gateway 104 at the time of receiving such information, the mobile can use this information to connect to the gateway 104. But in a scenario where the mobile 101 has already connected to the gateway 104, these pieces of information are redundant. Below shows a fourth example.

[TunnelSetup] SupportedTunnel=PPTP, L2TP/IPSec

[PPTP] Server=192.168.1.1;Username=1234;Password=1234

[L2TP] Server=192.168.1.1;Username=1234;Password=1234;

presharedkey=abcdefghi

[NotificationRegistration] Register=http://192.168.1.1/notification.html

Based on teaching stated above, it shall be noted that besides the type of tunneling protocol and authentication information, other information can be selectively added according to the requirements of the implementations. A fifth example is shown below.

[TunnelSetup] SupportedTunnel=PPTP

[PPTP] Server=192.168.1.1;Username=1234;Password=1234

In the step 303, the processor 201 is operative or configured to generate a barcode carrying the tunnel setup information. In this example, Quick Response Code (QR code) is used. QR code is a type of matrix barcode (or two dimensional barcode) containing information. As to creation of QR code, conventional technologies, e.g. java plugin etc. are available for use.

In the step 304, the WiFi transceiver receives a HTTP request for a certain web page from the mobile 101. Because the user does not know the link disruption, he still uses the mobile 101 to access some web page, e.g. google.com.

In the step 305, the processor 201 is operative or configured to intercept the HTTP request and return a HTTP web page with the barcode.

Interception is based on iptables rules for transparent proxying. If the gateway's interface is down, iptables rules are created so that all intercepted connections are redirected to the localhost at port 8080. Then these requests are handled by the processor 201. It results in a HTTP response which can contain some information about the cause of the intercepted request. In the embodiment, the web page for the HTTP response is used to convey the barcode.

As to the HTTP interception and HTTP page return, below shows two examples.

Example 1

HTTP Intercept with Spoofed DNS Response when the WAN (Gateway Link to the Internet) Connection is Down A user opens the Internet browser on a client device in the LAN, trying to access www.google.com (example).

The client device, such as the mobile 101, sends a DNS query to the NG gateway (no good gateway means a gateway whose link to the Internet becomes down) for www.google.com.

The gateway DNS server/forwarder is unable to forward the request, so it returns a DNS response resolving www.google.com to a non-local IP address.

The browser sends a HTTP GET message via the default route on the client device, which is the NG gateway.

The NG gateway intercepts this request and processes it internally. An HTTP response is returned to the client device which contains information about the cause of the intercepted request and/or guidance to analyze and solve the WAN connectivity problem.

Example 2

HTTP Intercept with Connection to WAN Address when the WAN Connection Goes Down

A user is using the Internet browser on a client device in the LAN, accessing www.google.com (example) via the WAN connection on the NG gateway.DNS information for www.google.com is cached in the client device (i.e. IPv4: 173.194.46.20).

The WAN connection becomes unavailable for some reason, i.e. physical disconnection or loss of DSL sync.

The user initiates a new request for www.google.com, the browser sends a HTTP GET message via the NG gateway, towards the cached address.

The NG gateway intercepts this request and processes it internally. An HTTP response is returned to the client device which contains information about the cause of the intercepted request and/or guidance to analyze and solve the WAN connectivity problem.

In the step 306, the processor 201 uses WiFi transceiver of the gateway 104 to establishe a tunnel with the mobile 101 as a communication backup link after the mobile 101 scans the barcode. Specifically, in some mobile applications, you can scan the QR code by pressing on the code for a period of time, e.g. 2 seconds. With all the tunnel setup information, the tunnel client on the mobile 101 sets up the tunnel in accordance with the selected tunneling protocols. And the iptables on the mobile 101 is also configured so that its data connection to the cellular network is open and traffic from the tunnel is redirect to the connection to the cellular network. Further, the iptables of the gateway 104 needs to be configured to make the traffic towards Internet forward to the tunnel. In addition, the mobile 101 registers with processor 201 of the gateway 104 a link restoration means, the a link restoration means including a control URL, e.g. http://192.168.1.1/notification.html?registration=http://address of the mobile 101/backupcontrol.html?GATEWAY=CP123456; linkrestored=yes). The control URL is used by the processor 201 of the gateway 104 to inform the mobile 101 of gateway main Internet link restoration.

After the connection is established, the data cellular network of the mobile 101 is used for access Internet by all user devices. It means that the gateway 104 connects to the other devices and provides Internet access by redirecting the traffic to the established tunnel. So the remote device 106 can diagnose and solve the disruption issue, e.g. by reconfiguring the gateway, and other user devices can access the Internet.

According to a variant, the processor 201 does not create the WiFi tunnel setup information every time the gateway Internet link disrupts. The WiFi tunnel setup information is created for the first time the link disrupts, and then it is stored in the non-volatile storage 206 for later use. In another variant, the WiFi tunnel setup information is not created at all, but is pre-configured and stored in the non-volatile storage 206.

According to a variant, the processor 201 does not perform the step 304 to generate the barcode. Instead, it sends the WiFi tunnel setup information in plain text in the web page to the mobile. After the mobile 101 displays the web page, the user needs to configure the mobile 101 to work in AP mode manually.

According to a variant, the device for providing backup Internet access does not limited to the mobile 101. Other devices are also possible as long as they have an Internet connection, which is not through the gateway, and a WiFi transceiver. For example, an iPad that has a cellular data network, or a PC that has another wired connection to the Internet (e.g. an ADSL connection). In a variant implementation, a PC has an Ethernet interface connecting to the Ethernet interface of the gateway and an ADSL interface for ADSL connection. In this implementation, the tunnel setup information includes information for setting up a tunnel over Ethernet link between the gateway and the PC.

The first link interface 202 detects the status of its link to the Internet periodically. When it detects the link is restored from disruption, the processor 201 sends a HTTP GET/POST to the control URL (for example http://address of the mobile 101/backupcontrol.html?GATEWAY=xxx; linkrestored=yes). The mobile 101 then notifies the user on the screen. The gateway 104 terminates the tunnel from the mobile 101 in accordance with the selected tunneling protocol.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Further, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method performed at a gateway having a connection to a network, the method comprising:
   detecting disruption of the connection to the network;
   after intercepting a HTTP request from a user device having a first connection to the gateway and a second connection to the network, returning a web page to the user device, the web page comprising a tunnel setup information for establishing a tunnel between the gateway and the user device; and
   establishing the tunnel between the gateway and the user device as a communication backup link to the network.

2. The method of claim 1, further comprising generating a barcode carrying the tunnel setup information, wherein the barcode is contained in the web page returned to the user device.

3. The method of claim 1, further comprising
   connecting to other user devices; and
   providing Internet access to the other user devices by redirecting traffic from the other user devices to the tunnel.

4. The method of claim 1, further comprising
   detecting restoration of the connection to the network;
   informing the user device of the restoration; and
   terminating the tunnel.

5. The method of claim 1, further comprising
   creating a control URL of the gateway enabling the user device to register a control URL of the user device;
   sending the control URL of the gateway to the user device; and
   receiving the control URL of the user device.

6. The method of claim 1, wherein the first connection is a WiFi connection.

7. A device comprising
   a first link interface configured to provide a connection to a network;
   a second link interface configured to provide a first connection to a user device, wherein the user device has a second connection to the network;
   a processor configured to;
   determine a disruption of connection to the network;

send a web page to the user device after having intercepted a HTTP request from the user device, the web page comprising a tunnel setup information for establishing a tunnel between the gateway and the user device; and establish the tunnel between the device and the user device as a communication backup link to the network.

8. The device of claim 7, wherein the processor is further configured to generate a barcode carrying the tunnel setup information, wherein the barcode is contained in the web page returned to the user device.

9. The device of claim 7, wherein
the first link interface is further configured to connect to other user devices; and
the processor is further configured to provide network access to the other user devices by redirecting traffic from the other user devices to the tunnel.

10. The device of claim 7, wherein
the first link interface is further configured to detect restoration of the connection to the network;
the processor is further configured to inform the user device of the restoration; and terminating the tunnel.

11. The device of claim 7, wherein
the processor is further configured to create a control URL of the device enabling the user device to register a control URL of the user device;
the first link interface is further configured to send the control URL of the device to the user device; and
the second link interface is further configured to receive the control URL of the user device.

12. The device of claim 7, wherein the first connection is a WiFi connection.

13. A non-transitory computer readable storage medium comprising program code instructions executable by a processor for:

detecting disruption of a connection of a gateway to a network, wherein a user device has a first connection to the gateway and a second connection to the network;
after intercepting a HTTP request from the user device, returning a web page to the user device, the web page comprising a tunnel setup information for establishing a tunnel between the gateway and the user device; and
establishing a tunnel between the gateway and the user device as a communication backup link to the network.

14. The Non-transitory computer readable storage medium according to claim 13, further comprising program code instructions for generating a barcode carrying the tunnel setup information, wherein the barcode is contained in the web page returned to the user device.

15. The Non-transitory computer readable storage medium according to claim 13, further comprising program code instructions for
connecting to other user devices; and
providing Internet access to the other user devices by redirecting traffic from the other user devices to the tunnel.

16. The Non-transitory computer readable storage medium according to claim 13, further comprising program code instructions for
detecting restoration of the connection to the network;
informing the user device of the restoration; and
terminating the tunnel.

17. The Non-transitory computer readable storage medium according to claim 13, further comprising program code instructions for
creating a control URL of the gateway enabling the user device to register a control URL of the user device;
sending the control URL of the gateway to the user device; and
receiving the control URL of the user device.

* * * * *